United States Patent [19]
Mollon

[11] 4,039,842
[45] Aug. 2, 1977

[54] FUEL STORAGE RACK

[75] Inventor: Leslie Mollon, Southfield, Mich.

[73] Assignee: Brooks & Perkins, Incorporated, Southfield, Mich.

[21] Appl. No.: 647,577

[22] Filed: Jan. 8, 1976

[51] Int. Cl.² .............................................. G21F 5/00
[52] U.S. Cl. ..................................... 250/518; 176/87; 176/88; 250/515
[58] Field of Search ............... 250/515, 517, 518, 506, 250/507; 176/28, 30, 87, 88, 79

[56] References Cited
U.S. PATENT DOCUMENTS

| 3,164,530 | 1/1965 | Banks | 176/87 |
|---|---|---|---|
| 3,229,096 | 1/1966 | Bonilla et al. | 250/507 |
| 3,667,540 | 6/1972 | Kupp | 250/507 X |
| 3,859,533 | 1/1975 | Suvanto | 250/518 X |
| 3,930,166 | 12/1975 | Bochard | 250/515 X |

Primary Examiner—Archie R. Borchelt
Attorney, Agent, or Firm—Whittemore, Hulbert & Belknap

[57] ABSTRACT

A storage rack for spent nuclear fuel elements comprising a multiplicity of elongated hollow containers of uniform cross-section, preferably square, some of said containers having laterally extending continuous flanges extending between adjacent containers and defining continuous elongated chambers therebetween for the reception of neutron absorbing panels.

18 Claims, 7 Drawing Figures

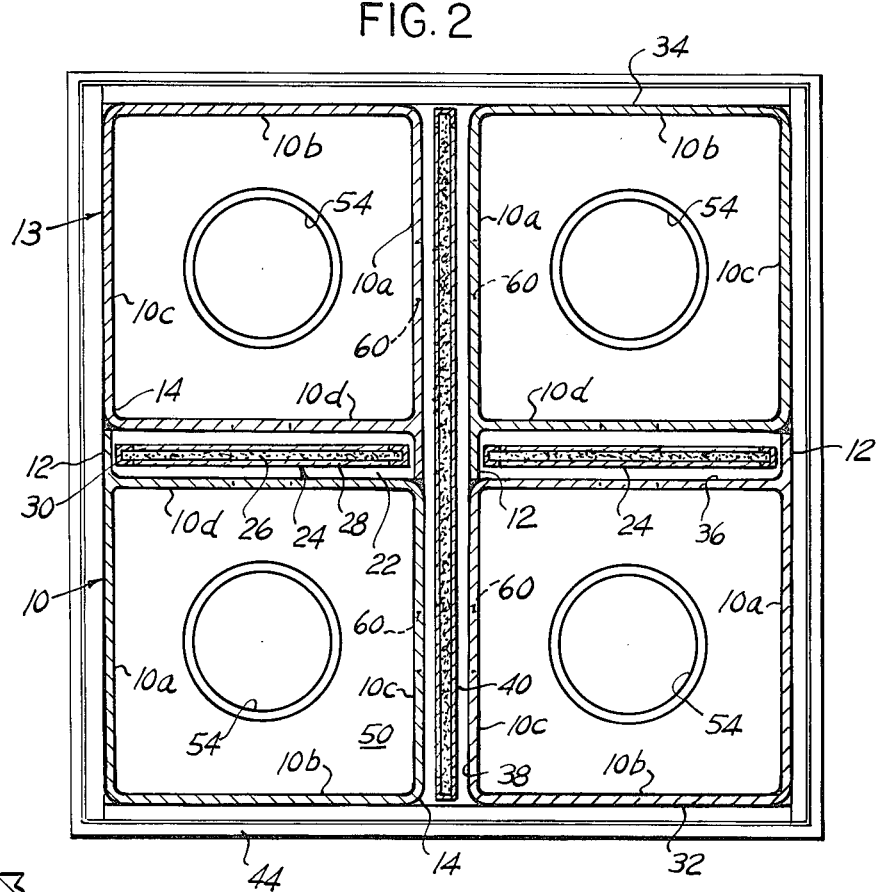
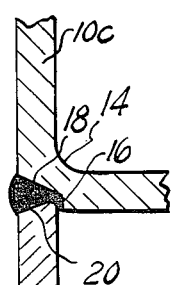
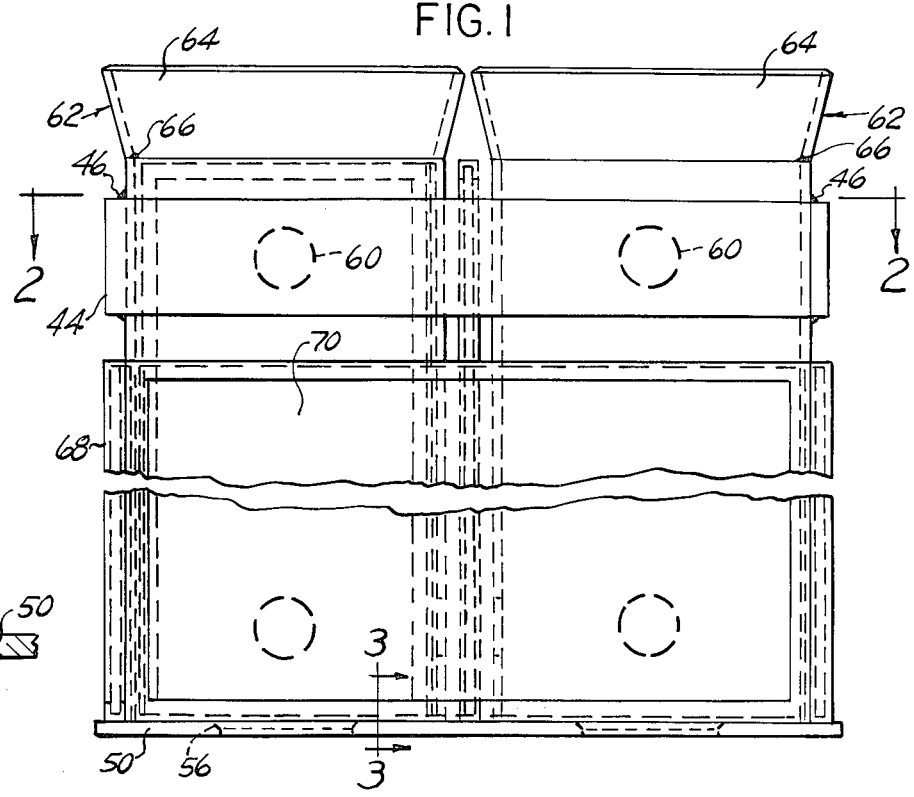
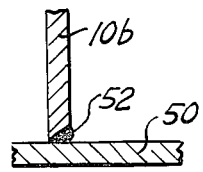

4,039,842

FUEL STORAGE RACK

BRIEF SUMMARY OF THE INVENTION

In nuclear power installations the neutron fuel elements which, after the useful life of such elements in the generation of nuclear power, remain highly radioactive and particularly characterized by the emission of neutrons. These fuel elements are placed in pools for extended periods until the radioactivity decays to a point where the fuel elements may be safely handled.

The present invention relates to racks made up of a multiplicity of elongated containers of uniform cross-section, the containers being spaced apart and interconnected in such a way as to provide spaces between adjacent containers for the reception of neutron absorbing panels.

The neutron absorbing panels for use with which the present rack has been designed, are preferably in the form of an elongated sandwich having a central layer of neutron absorbing material such for example as boron carbide. The intermediate layer of boron carbide is provided on opposite sides with a thin sheath of aluminum and preferably the aluminum sheath is extended over the ends and edges of the panel.

In accordance with the preferred embodiment of the invention each of the containers is of generally rectangular cross-section although other cross-sectional shapes are possible. For example, the containers may if desired be of circular cross-section. Alternatively, they may have a cross-sectional shape of a regular polygon such for example as a hexagon. Individual containers may be aluminum and they may be produced by extrusion or as weldments.

While the dimensions of the containers may vary in accordance with different fuel rods, it is to be noted that the transverse dimension of the individual containers is substantially less than 12 inches, while the length is relatively great, as for example in excess of 10 feet.

The individual containers are assembled together with spacing provided between some or all of the individual adjacent containers, and provision is made for the application of a neutron absorbing panel at the outside of each assembly of containers. The space between adjacent containers is formed by the confronting side walls of adjacent containers and laterally extending continuous flanges formed on one or both of the containers and having the outer edge of each contiguous to a side wall of the adjacent container. The free edge of each flange may if desired, be welded to the adjacent container. Alternatively, the adjacent containers may be retained in assembled relation by one or more surrounding bands or belts adjacent the tops of the assembled containers, the bottoms of the containers being welded to a continuous bottom plate forming a partial closure for the bottom of each container.

BRIEF DESCRIPTION OF THE DRAWINGS

FIG. 1 is a side elevation of the rack with the intermediate portion omitted.

FIG. 2 is a section on the line 2—2, FIG. 1.

FIG. 3 is a fragmentary sectional view illustrating the connection of the bottoms of the containers to the bottom plate.

FIG. 4 is an enlargement of the connection shown at 4 in FIG. 1.

DETAILED DESCRIPTION

Figure 5:
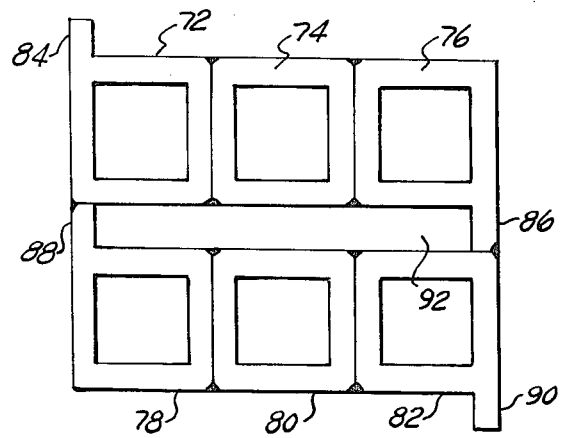
FIGS. 5–7 are fragmentary sectional views illustrating different modes of interconnection of individual containers.

While ordinarily the number of containers assembled together to form a single rack will be far in excess of four, as for example up to 100, the four-container rack illustrated in FIGS. 1 and 2 embodies the significant features and simplifies the description.

The rack is composed of a multiplicity of individual elongated generally tubular elements 10 which as illustrated in FIGS. 1 and 2, are square in cross-section.

As best seen in FIG. 1 the containers 10 are extrusions having side walls 10a, 10b, 10c and 10d, and a continuous longitudinal flange 12 extending laterally from one corner thereof.

While the illustrated, and preferred embodiment of the invention comprises the use of extruded containers, it will of course be apparent that the containers might be formed from one or more elongated flat plates bent into the configuration illustrated and suitably welded to form an effectively integral construction.

The container 10 is brought into juxtaposition with respect to a second container 13 which may be identical to the container 10, having side walls 10a, 10b, 10c and 10d and a laterally extending flange 12. The flange 12 of the container 10 is substantially abutted against a corner 14 of the adjacent container 13. The connection between the free edge of the flange 12 and the corner 14 is indicated in FIG. 4. Here, it will be observed that at the outer surface of the corner 14 there is provided a continuous groove having a flat surface 16 parallel to the side wall 10c and a beveled or inclined surface 18. The free edge of the flange 12 may be perpendicular to the width of the flange or it may be slightly inclined as indicated at 20, either arrangement providing a V-shaped cross-section recess for the reception of welding metal.

From an inspection of FIG. 1 it will be observed that the flanges 12 constitute the end walls of an elongated narrow, flat space 22 which is dimensioned to receive a neutron absorbing panel indicated in its entirety at 24. The panel 24 includes a core 26 of neutron absorbing material surrounded at opposite sides by thin sheaths 28 of aluminum which also extend over the ends and edges thereof as indicated at 30. Suitable means (not shown) may be provided on the panel 24 or on the structure of the containers to support the panel 24 in the spaced relationship between adjacent side walls 10d of the containers.

As shown in FIG. 2, two additional containers here designated 32 and 34, are provided, each having the laterally extending flanges 12 to define with the adjacent side walls 10d thereof a second space here designated 36 for the reception of a second neutron absorbing panel 24. As shown in the Figure, the side walls 10c and 10a of the containers 10 and 13 are separated from side walls 10c and 10a of containers 32 and 34 to provide a space 38 for the reception of a neutron absorbing panel 40 which as will be observed is of a width sufficient to extend for the full width of the space 38.

In order to retain the containers 10, 15, 32 and 34 in the spaced relationship illustrated in FIG. 1, there is provided a continuous band or belt 44 illustrated as made up of four separate elongated elements but which may of course be a single continuous strip bent to conform to the outer surfaces of the containers. This locating or support band 44 is welded to the outer surface of the several containers as illustrated at 46 and maintains the upper ends of the containers accurately in the illustrated position.

The bottom of the individual containers are welded to a generally rectangular adapter or support plate 50, the bottom edges of the individual containers being welded to the plate 50 as indicated at 52. It will be observed that the plate 50 is provided with circular openings 54 in alignment with each container to provide for circulation of water therethrough surrounding the fuel element therein. The openings 54 are beveled as indicated at 56 in FIG. 2.

The side walls of the containers are provided with circular openings 58 adjacent the bottoms thereof and additional openings 60 adjacent the tops thereof. These openings, as best apparent in FIG. 1, are provided only in container side walls which confront the side walls of adjacent containers.

Preferably, truncated pyramidal funnels 62 are provided which may be prefabricated by welding together flat plates 64 having a trapezoidal configuration. The funnel structure may then be welded to the upper ends of each container as indicated at 66.

To complete the rack shown in FIGS. 1 and 2, flat rectangular panels 68 and 70 of neutron absorbing material are provided at the outer sides of the rack, these being suitably welded to the outer surfaces of the containers and/or to each other at adjacent corners thereof.

With this arrangement it will be observed that each of the several containers making up the rack is surrounded at all four sides by a neutron absorbing panel and these panels are so arranged that no free escape path is provided for neutrons being intercepted by one of the panels.

In FIG. 5 there is illustrated a somewhat different arrangement of containers. In this case adjacent containers such as indicated at 72, 74 and 76 are in side-by-side contact, as are containers 78, 80 and 82. However, containers 72 and 76 are provided with continuous longitudinal, laterally extending flanges 84 and 86. Containers 78 and 82 are provided with continuous longitudinal, laterally extending flanges 88 and 90. It will be observed that the flanges 86 and 88, together with side walls of the six containers illustrated in FIG. 5, define a space 92 for the reception of a relatively wide elongated panel of neutron absorbing material. In this Figure the flanges 84 and 90 are available for connection to additional sets of containers so that the number of containers may be indefinitely expanded.

Figure 6:
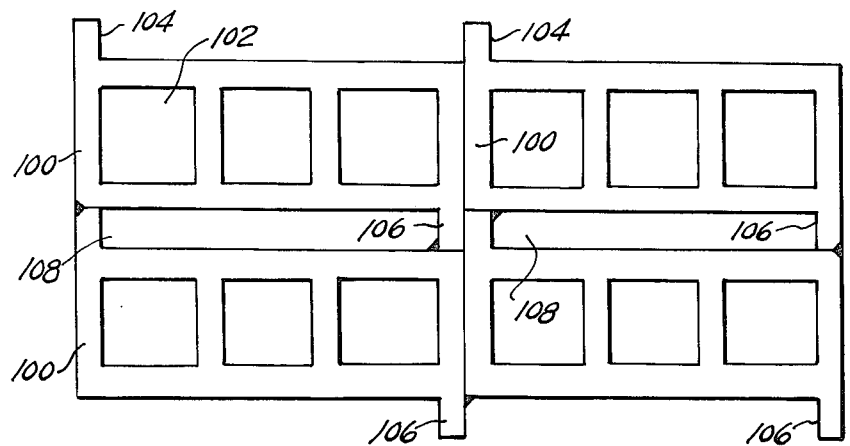

Referring now to FIG. 6 there is shown an arrangement in which a single extrusion indicated at 100 is provided with two or more, and as illustrated three, fuel containing spaces 102. Each of the extrusions 100 is provided with continuous longitudinal, laterally extending flanges 104 and 106. A plurality of four extrusions is illustrated in FIG. 6 in which the flanges 104 and 106 cooperate to define the absorbing material. Again, the assembly as shown in this Figure, as in all other arrangements, will normally be provided with exterior sheaths or panels of neutron absorbing material (not shown in these Figures) to prevent free escape of neutrons.

Figure 7:
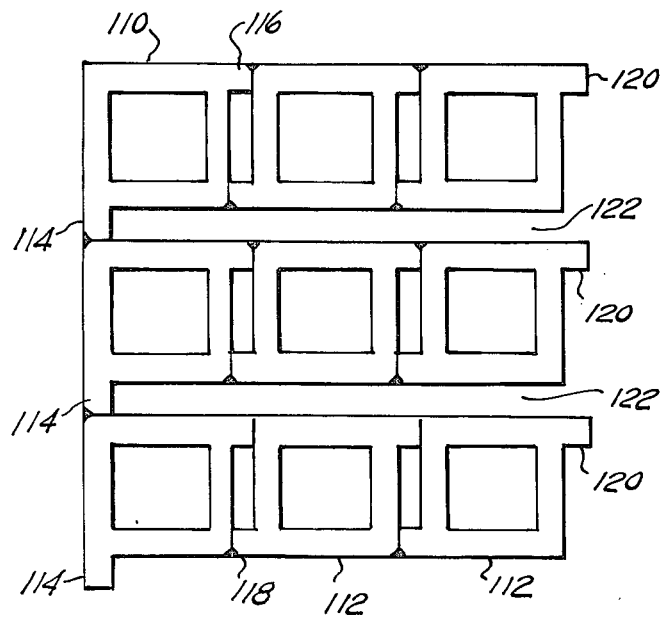

A somewhat different arrangement is illustrated in FIG. 7 in which extrusions 110 are associated with extrusions 112 as illustrated so that the continuous flanges 114, 116, 118 and 120 define the elongated spaces 122 for the reception of flat neutron absorbing panels and the spaces 124 intermediate each adjacent pair of containers for receiving a relatively narrow neutron absorbing panel.

It will of course be apparent that the container arrangements illustrated in FIGS. 5-7 may be indefinitely expanded to provide a multiplicity of spaces for containing spent nuclear fuel with neutron absorbing panels interposed between each container or between each set of containers. As previously noted, each of the racks made up of the assemblies illustrated in these Figures is completed by the provision of the exterior neutron absorbing panel such as illustrated at 68 and 70 in FIG. 2.

Where a laterally projecting flange such as the flanges 84 or 90 of the construction shown in FIG. 5, project outwardly from the desired assembly of containers, these flanges will simply be omitted or removed.

From a comparison of FIGS. 1, 5, 6 and 7 it will be noted that each container may be of generally square cross-section with a single flange extending from one edge thereof substantially as a continuation or extension of one flat side wall of the container. Such a construction may be produced by extrustion in which of course the entire container is integral. It may however, be produced by bending one or more flat sheets of material to constitute sides of the container which will then be edge-welded to a similarly bent strip to produce what is essentially an integral construction.

However, each container need not necessarily be limited to an arrangement for receiving a single fuel cell. Thus, in FIG. 5, the elements 72, 74 and 76 which separately would constitute containers of square cross-section, are placed into juxtaposition with adjacent flat sides thereof secured together as for example by welding at adjacent corners. In this construction the elements 72, 74 and 76 may be considered as a single container having a rectangular cross-section, the length of which is a substantially equal multiple of its width. In this case the length of the cross-section will of course be somewhat in excess of three times the width. The composite container will then be charactized by the provision, in an essentially integral construction, by the provision therein of a multiplicity of square cross-sections through openings therein.

In FIG. 6 a construction similar to that shown in FIG. 5 is illustrated in whih each of the elements 100 may be constituted in the form of a single extrusion, in which case the square openings therethrough are separated only by a wall of single thickness rather than the double thickness illustrated in FIG. 5.

In a typical example, the individual containers have a wall thickness of approximately ¼ inch. The length of the individual tubes assembled to form the rack is in excess of 12 feet, and the width of the container walls is approximately 6 to 8 inches. The material from which the containers are fabricated is of course metal and any suitable metallic material such as aluminum or steel may be employed.

What I claim as my invention is:

1. A storage rack for storing elongated radioactive nuclear fuel elements in upright shielded position comprising a plurality of elongated metal containers having longitudinally extended openings therethrough for receiving fuel elements, support means mounting said containers in parallel vertical relationship with at least some of said containers comprising pairs of adjacent spaced apart containers, the containers of each of said pairs including a longitudinally extending flange integral with one of said containers and extending laterally therefrom into close proximity and having the free edge thereof bonded to the other container to define with the adjacent side walls of the pair of containers a partially enclosed vertically extending space, and a separate flat neutron absorbing panel received in said space in position to intercept neutrons emitted from one container in a direction to enter the other container of said pair.

2. A rack as defined in claim 1 in which the panels are positioned with their side walls in spaced relation to the adjacent side walls of said containers.

3. A rack as defined in claim 2 in which each container of said pair is provided with a flange as described in claim 1 whereby the adjacent side walls of the containers of said pair and said flanges define a vertically extending space fully enclosed laterally to receive said panel.

4. A rack as defined in claim 3 in which said rack comprises a plurality of sets of containers, each set being laterally spaced from an adjacent set to provide spaces between the adjacent container side walls of adjacent sets, and neutron absorbing panel means in all of said spaces dimensioned to intercept neutrons emitted from one set of containers in a direction to enter the other set of containers.

5. A rack as defined in claim 1 in which said containers are of regular polygonal cross-section with the adjacent walls of adjacent containers parallel to define vertically elongated narrow panel-receiving spaces of a width conforming to the width of a side wall of a container.

6. A rack as defined in claim 5 in which said containers are of square cross-section.

7. A rack as defined in claim 1 in which said support means comprises a horizontal metal plate to which the lower ends of said containers are secured.

8. A rack as defined in claim 7 in which said plate has an enlarged opening therethrough in alignment with the opening in each container secured thereto.

9. A rack as defined in claim 6 in which said support means comprises a horizontal metal plate to which the lower ends of said containers are secured.

10. A rack as defined in claim 1 in which said rack comprises neutron absorbing panels secured to the outer side walls of said containers.

11. A storage rack for storing radioactive nuclear fuel elements in upright shielded relation comprising a multiplicity of elongated rectangular cross-section tubular containers open at the top, support means mounting said containers in vertical position with side walls of said containers in spaced apart parallel relation, and flange means integral with said containers and extending laterally therefrom for the full height thereof, as an extension of one side thereof across the space between adjacent containers to define with the adjacent side walls of adjacent containers a vertically elongated neutron absorbing panel receiving enclosure of a rectangular cross-section, said cross-section having a length equal to the width of a side wall of a container and a width equal to the spacing between confronting side walls of said containers.

12. A rack as defined in claim 11 in which each container is of square cross-section.

13. A rack as defined in claim 11 in which each of said containers is of rectangular cross-section whose length is substantially an integral multiple of its width, each of said containers having a multiplicity of elongated separated fuel-receiving cells of generally square cross-section.

14. A rack as defined in claim 13 in which each of said containers is composed of a series of aligned subcontainers of square cross-section with flat sides thereof connected directly together.

15. A rack as defined in claim 12 in which the rack comprises outer side walls secured to the outer sides of the assembly of containers, which side walls are neutron absorbing panels.

16. A rack as defined in claim 15 in which said panels extend upwardly from the bottom of said containers but terminate below the top thereof, said support means comprising in addition a metal band surrouding the assembly of containers above the upper ends of the outer side walls formed by said panels, said band being bonded to the upper ends of the container exposed at the outside of the assembly thereof.

17. An elongated container for association with a plurality of similar containers to form a fuel rack, said container comprising an elongated tubular element of generally square cross-section having a continuous through opening of generally square cross-section and an attachment and spacing flange at one corner of the container extending for the full length thereof and positioned generally to constitute an extension in the plane of one side wall thereof.

18. A container as defined in claim 17 in which said container is an aluminum extrusion having a wall thickness of about ¼ inch, a length in excess of 12 feet, and a width of approximately 6–8 inches.

* * * * *